United States Patent [19]
Lecouffe

[11] 3,713,889
[45] Jan. 30, 1973

[54] PROCESS FOR THE FIXING OF THE RELATIVE CHARGING STATES OF THE ELECTRODES OF AN ALKALINE STORAGE CELL

[75] Inventor: Yves Jacques Felix Lecouffe, Paris, France

[73] Assignee: Societe des Accumulateurs Fixes et de Traction (Societe Anonyme), Romainville, France

[22] Filed: Nov. 26, 1971

[21] Appl. No.: 202,308

[30] Foreign Application Priority Data

Nov. 30, 1970 France..................................7043008

[52] U.S. Cl.............................................136/6, 136/165
[51] Int. Cl..............................................H01m 35/00
[58] Field of Search ......320/2, 39, 40, 35; 136/6, 28, 136/29, 165, 175

[56] References Cited

UNITED STATES PATENTS

| | | | |
|---|---|---|---|
| 2,980,748 | 4/1961 | Piroux | 136/29 |
| 3,174,879 | 3/1965 | Stanimirovitch | 136/28 X |

OTHER PUBLICATIONS

"Alkaline Secondary Cells", Wm. W. Jakobi, Encyclopedia of Chemical Technology (Reprint), Vol. 3, (1963) pp. 207, 208.

Primary Examiner—D. F. Duggan
Assistant Examiner—Robert J. Hickey
Attorney—Francis T. Carr et al.

[57] ABSTRACT

Process for fixing the relative charging states of electrodes of an alkaline storage cell having thin electrodes of less than 1 mm thickness separated by a narrow gap that is less than or equal to 0.3 mm and in which the negative electrode has a higher capacity than the positive electrode. The storage cell in open state with electrolyte therein after complete charging of the positive electrode is given an overcharge at a temperature below 0°C. and a low as −5° or −10°C. so that the charged capacity of the negative electrode is higher than that of the positive electrode but has a selected predetermined excess value less, however, than the maximum capacity to which it may be charged in the storage cell.

6 Claims, 1 Drawing Figure

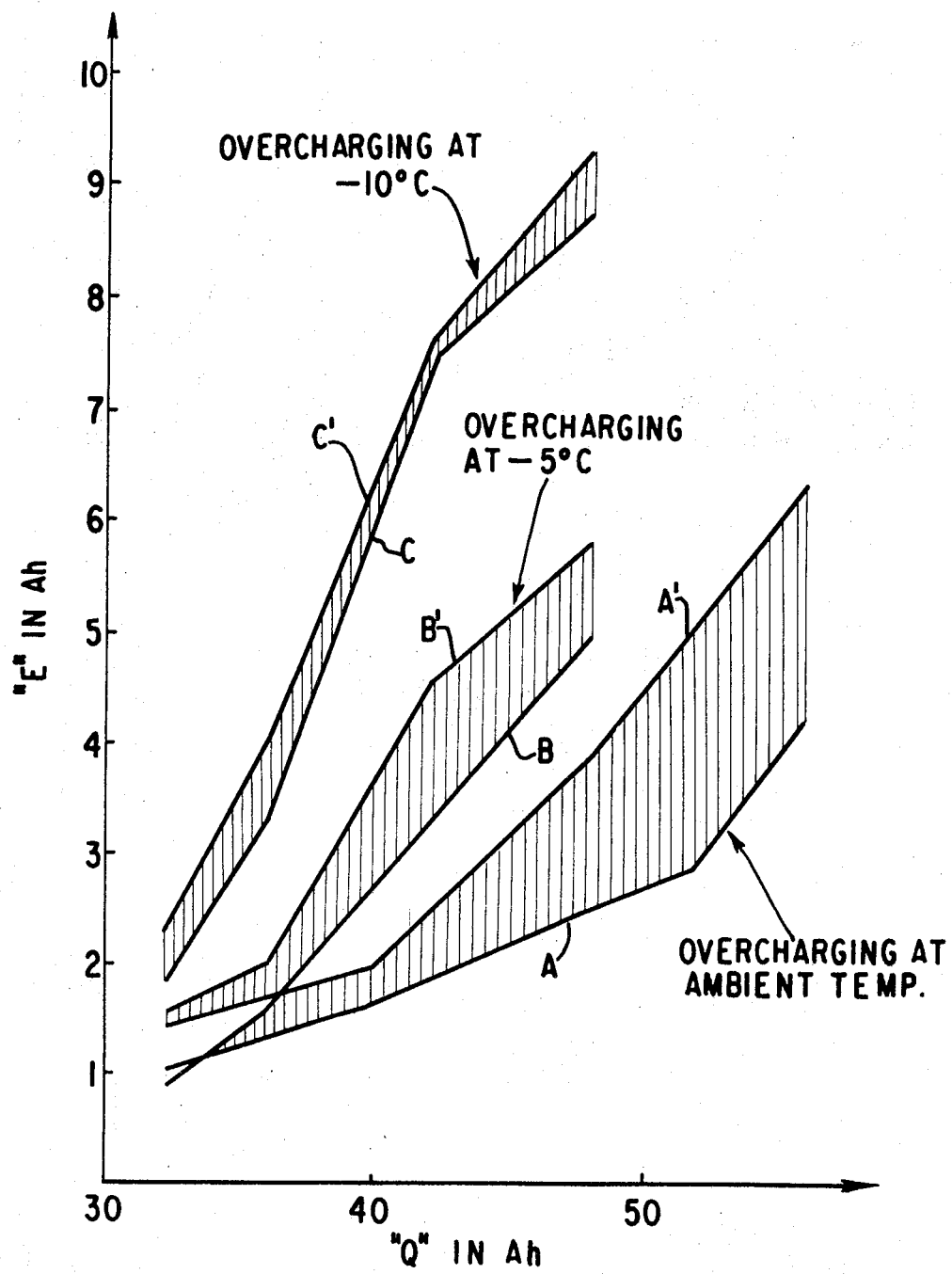

PROCESS FOR THE FIXING OF THE RELATIVE CHARGING STATES OF THE ELECTRODES OF AN ALKALINE STORAGE CELL

BRIEF SUMMARY OF INVENTION

The invention relates to a process for fixing the relative charging states of the electrodes of an alkaline storage cell, and more particularly of a storage cell having thin electrodes separated by a gap of small size.

In an alkaline storage cell, for example, in a nickel-cadmium storage cell, the discharge of the negative electrode, which is a form of discharge involving two solid phases, takes place at a practically constant potential. On the contrary, the discharge of the positive electrode, which takes place in a single solid phase, may be represented by a substantially inclined curve. The result is that, if the two electrodes reach the end of discharge practically together, or if the negative electrode is discharged before the positive electrode, the voltage of the storage cell will diminish slowly. If it is desired to achieve definite cessation of discharge, it is important that the negative electrode should not yet be discharged when the positive electrode reaches the end of discharge. Thus, the charged capacity of the negative electrode must be higher than the capacity of the positive electrode. Furthermore, if the negative electrode retains, up to the end of discharge, a charged capacity, i.e., metallic cadmium, it conductivity is good and this introduces a supplementary improvement into the discharge curve, at the end of discharge.

However, since it is also important that, at the end of charging and overcharging, there should be practically no formation of hydrogen, the positive electrode must be the first electrode at which electrolyte electrolysis products commence to form, whatever the temperature conditions to which the storage cell is subjected. Since the capacity which the positive electrode is able to store is highly variable depending on the temperature of the storage cell, it is therefore necessary that the chargeable portion of the capacity of the negative electrode should be higher under all circumstances than that of the positive electrode.

Consequently, in order to satisfy the two conditions set forth hereinabove, it is necessary to impart to the negative electrode a total capacity which is higher than that of the positive electrode and to impart to it, relative to the positive electrode, an excess of charged capacity, the capacity then attained in respect of the negative electrode being, however, lower than its total true capacity, the latter being the maximum capacity with which it may be charged within the storage cell.

Thus, it is necessary to give this capacity excess an extremely precise value.

It has already been proposed to separately precharge the negative electrode. However, this process has the disadvantage that it subjects the negative electrodes to a supplementary assembly and demounting operation. Furthermore, there is produced, during the manipulation in the presence of air, uncertain oxidation of the thus-charged portion of the negative electrode.

Theoretically, in order to avoid this disadvantage and in order to obtain this charging state, it would suffice to overcharge the storage cell, when it is in the open state, by a quantity such and at a rate such that the negative electrode attains the desired charged state. Taking account of the charging efficiency of the electrodes, which could be determined by prior tests, it would thus be possible to supply an excess of charged capacity determined at the negative electrode. This is found to be true in respect of storage cells where there is no interaction between the electrodes.

However, in the case of storage cells (notably fluid-tight or sealed storage cells) with electrodes having a thin sintered support and separated by a small gap, the dispersion of the results is such that it does not prove to be possible to determine what quantity of electricity is required to be supplied to the storage cell in order that the negative electrode may attain the desired charge state. In fact, the oxygen forming on the positive electrode is transferred in a dissolved state by diffusion and convection towards the negative electrode where it is reduced, thus proportionately diminishing the charging efficiency of the negative electrode. These diffusion and convection phenomena depend, for their intensity on various factors, some of these being the distance between the electrodes and the temperature, so that it is almost impossible to provide conditions which are sufficiently reproducible. Furthermore, gaseous evolution of excessively long duration is harmful to the positive electrode.

The invention makes it possible to remedy these disadvantages.

It relates to a process for the fixing of the relative charging states of the electrodes of an alkaline storage cell, and more particularly of a storage cell having thin electrodes, the thickness of which is less than 1 mm, separated by a small gap, preferably equal to or less than 0.3 mm, and wherein the negative electrode has a capacity which is higher than that of the positive electrode and whereby there is imparted to the storage cell, in the open state, after complete charging of the positive electrode, an overcharge sufficient to ensure that the negative electrode is in a charged state such that its charged capacity is higher than that of the positive electrode, characterized in that, in order to obtain a predetermined value for the said charged capacity excess, at least the said overcharging is effected at a temperature lower than 0°C. and preferably lower than −5°C.

Advantageously, the said overcharging may be effected at approximately −10°C.

According to a feature of the invention, the excess of charged capacity of the negative electrode ranges between 10 and 50 percent of the difference existing between the total true capacity of the negative electrode and the capacity of the positive electrode.

Other objects and features of the invention will become apparent from the following detailed description and the accompanying drawing which is a graph illustrating advantageous features resulting from the practice of the invention.

DETAILED DESCRIPTION

The invention will be better understood by referring to the description given hereinbelow, which relates to the fixing of the relative charging states of the electrodes of a nickel-cadmium storage cell comprising 12 positive electrodes having a thin sintered support, the dimensions of which are 117 × 74 mm, with an average thickness of 0.98 mm, and 13 negative electrodes having a thin sintered support of the same dimensions, the average thickness thereof being 0.76 mm, the average separation gap between two adjacent electrodes being 0.25 mm.

The electrolyte is a solution of potassium hydroxide of density 1.306, approximately 3.1 cm$^3$ per Ah of true capacity of the storage cell.

In the open cell, there have been charged increasing quantities of electricity, staring from 30 Ah, at 3 amperes, and endeavoring to attain or exceed the value of 5 Ah in respect of the excess of charged negative capacity. The series of tests have been effected at ambient temperature (20°C), at −5°C and at −10°C.

With regard to the two last series, only overcharging was effected at the low temperatures.

They were measured, in discharge at 4.8 amperes, the positive and negative discharged capacities, by means of the potential of the electrodes taken relative to the casing and interrupting discharging at potential 0 as thus defined.

For each test, in the following table, there have been indicated the extreme values obtained for a series of identical storage cells, this showing the dispersion of the results.

TABLE I

| Temperature | Quantity of electricity supplied in Ah. | Capacity of the positive electrode in Ah. | Capacity of the negative electrode in Ah. | Excess of charged capacity of the negative electrode in Ah. |
|---|---|---|---|---|
| Ambient temperature | 32 | 23.5 – 23.75 | 24.5 – 25.25 | 1 – 1.5 |
| | 40 | 24.8 – 24.6 | 27.8 – 26.2 | 1.6 – 2 |
| | 48 | 24 – 24 | 26.6 – 27.9 | 2.6 – 3.9 |
| | 52 | 24 – 24.3 | 26.9 – 29.4 | 2.9 – 5.1 |
| | 56 | 24.7 – 24.9 | 31.1 – 29.2 | 4.3 – 6.4 |
| −5°C | 30 | 22.3 – 22.5 | 23.4 – 23.3 | 1.35 – 0.75 |
| | 36 | 22.8 – 24.3 | 23.4 – 25.4 | 1.6 – 2 |
| | 42 | 23.6 – 24.3 | 27 – 26.9 | 3.4 – 4.6 |
| | 48 | 24.9 – 24.7 | 30.7 – 29.7 | 5.8 – 5 |
| −10°C | 32 | 23.5 – 22.7 | 25.3 – 25 | 1.8 – 2.3 |
| | 36 | 23.5 – 23.8 | 27.5 – 27.1 | 4 – 3.3 |
| | 42 | 24.7 – 25 | 32.2 – 32.6 | 7.5 – 7.6 |
| | 48 | 27.6 – 27.7 | 37 – 36.45 | 9.4 – 8.75 |

These results are shown by curves plotted on the accompanying drawing wherein the quantity of electricity supplied Q (in Ah) is plotted as abscissa and the excess of charged negative capacity E (in Ah) is plotted as the ordinate.

The limit curves (A) and (A') relate to overcharging at ambient temperature, the curves (B) and (B') to overcharging at approximately −5°C and the curves (C) and (C') to charging at approximately −10°C.

It will clearly be perceived that:

the slope of the curves increases when the temperature decreases. Thus, it is possible to reduce the overcharging time by operating at low temperature and, conversely, for the same overcharging time there are obtained at low temperature higher values of the excess of charged negative capacity.

The dispersion between the measurements decreases with the temperature.

By studying the three series of curves, it is observed that the interaction between the electrodes is greater at 20°C than at −5°C and, a fortiori, than at −10°C. This finding does in fact show the progressively more pronounced diminution in the flow of oxygen transferred in the dissolved state by diffusion and convection, as the overcharging temperature decreases.

Since the difference between the total true capacity of the negative electrode and the capacity of the positive electrode (once it has been introduced into the storage cell) is approximately 15 Ah in the example described, the significance of operating at approximately −10°C, in order to achieve an excess of charged capacity amounting to as much as 50 percent of the said difference, thus permitting the achievement of a high degree of precision in the value of overcharging supplied at the negative electrode, will be apparent.

Of course, the invention is by no means limited to the mode of embodiment described, which has been given purely by way of example. Variations within the scope of the appended claims are contemplated.

What is claimed is:

1. Process for fixing the relative charged states of positive and negative electrodes of an alkaline storage cell prior to use and while said cell is in open unsealed state, said electrodes being thin and closely spaced, said negative electrode having a total capacity higher than the total capacity of the positive electrode comprising the steps of charging the cell in its open unsealed state to effect full total charge of the positive electrode and thereafter overcharging said cell still in open unsealed state to provide a charged capacity to the negative electrode which is in excess of the total capacity of the fully charged positive electrode but less than the total capacity of said negative electrode, said overcharging being effected at a temperature below 0°C.

2. Process according to claim 1 wherein said overcharging is effected at a temperature ranging between −5°C. and −10°C.

3. Process according to claim 1 wherein the excess of said charged capacity of the negative electrode ranges from between 10 and 50 percent of the existing difference between the total capacity of the negative electrode and the total capacity of the positive electrode.

4. A process for fixing the relative charged states of positive and negative electrodes of alkaline storage cells while said cells are in open unsealed state, said cells being of the nickel cadmium type having thin positive and thin negative electrodes each up to 1 mm thick and spaced not greater than approximately 0.3 mm apart and wherein the negative electrode has a total capacity higher than the total capacity of the positive electrode comprising charging the cell in its open state to effect total charging of the positive electrode, and then overcharging the still unsealed cell to provide a charged capacity to the negative electrode which exceeds the capacity of the totally charged positive electrode and which charged capacity of the negative electrode ranges from between 10 and 50 percent of the existing difference between the total capacity of the negative electrode and the total capacity of the positive electrode, said overcharging being effected at temperatures ranging from −0°C. to −10°C.

5. Process according to claim 1 wherein said cell is sealed subsequent to said overcharging.

6. Process according to claim 4 wherein said cells are sealed subsequent to said overcharging.

* * * * *